United States Patent [19]

Kurata et al.

[11] Patent Number: 5,043,613
[45] Date of Patent: Aug. 27, 1991

[54] BUILT-UP STEPPING MOTOR

[75] Inventors: Kazuyuki Kurata, Shizuoka; Hideo Saji, Aichi; Tsutomu Saito, Toyohashi; Kazuhiro Takehara, Iwata; Mitsumasa Inagaki, Kariya, all of Japan

[73] Assignees: ASMO Co., Ltd., Kosai; Nippondenso Co., Ltd., Kariya, both of Japan

[21] Appl. No.: 565,619

[22] Filed: Aug. 10, 1990

[30] Foreign Application Priority Data

Aug. 10, 1989 [JP] Japan ................. 1-93379[U]

[51] Int. Cl.$^5$ .................. H02K 37/24; H02K 15/14; H02K 7/116; H02K 5/02
[52] U.S. Cl. .................. 310/49 R; 310/89; 310/91; 310/99; 310/42
[58] Field of Search ........... 310/49 R, 89, 91, 99, 310/42, 43, 257

[56] References Cited

U.S. PATENT DOCUMENTS

| | | | |
|---|---|---|---|
| Re. 28,075 | 7/1974 | Kavanaugh | 310/49 R |
| 3,495,107 | 2/1970 | Haydon | 310/49 R |
| 3,558,940 | 1/1971 | Chesnut et al. | 310/41 |
| 3,671,841 | 6/1972 | Hoffman | 310/696 |
| 3,783,313 | 1/1974 | Mathur | 310/49 R |
| 4,333,026 | 1/1982 | Bock et al. | 310/42 |
| 4,381,465 | 4/1983 | Renkl et al. | 310/49 R |
| 4,714,850 | 12/1987 | Akiba et al. | 310/49 R |
| 4,794,292 | 12/1988 | Torisawa | 310/257 |
| 4,825,112 | 4/1989 | Mineyama | 310/71 |
| 4,841,190 | 6/1989 | Matsushita et al. | 310/257 |
| 4,990,806 | 2/1991 | Kikuchi et al. | 310/49 A |

FOREIGN PATENT DOCUMENTS

| | | | |
|---|---|---|---|
| 0004459 | 1/1986 | Japan | 310/49 R |
| 0035152 | 2/1986 | Japan | 310/49 R |
| 0098150 | 5/1986 | Japan | 310/49 R |
| 62-7761 | 1/1987 | Japan . | |
| 62-14950 | 1/1987 | Japan . | |
| 0037051 | 2/1987 | Japan | 310/49 R |
| 63-5419 | 11/1988 | Japan . | |
| 0136551 | 5/1989 | Japan | 310/49 R |

*Primary Examiner*—William H. Beha, Jr.
*Assistant Examiner*—Dennis R. Haszko
*Attorney, Agent, or Firm*—Burns, Doane, Swecker & Mathis

[57] ABSTRACT

A built-up stepping motor includes upper and lower housings each having an internal space and joined together with a support plate disposed therebetween. The lower housing retains therein a stator and a rotor disposed in the stator, while the upper housing holds therein a reduction gear for reducing the output speed of the motor. The output end of a rotor shaft extends through the support plate and meshes with a first gear of the reduction gear. The upper and lower housings are assembled together by interlocking engagement between locking projections and mating holes. A shock-absorbing damper is disposed between two stator cores to protect them against chattering.

6 Claims, 4 Drawing Sheets

BUILT-UP STEPPING MOTOR

BACKGROUND OF THE INVENTION

1. Field of the Invention

The present invention relates generally to stepping motors for use in business machines such as printers and automotive electric equipment, and more particularly to a permanent-magnet, built-up stepping motor.

2. Description of the Prior Art

In the manufacture of gearmotors, a motor unit and a reduction gear must be assembled neatly without mismatches between the reduction gear and bearings by which a rotor is supported. An example of such gearmotors disclosed in Japanese Utility Model Publication No. 63-5419 has a built-up construction composed of various component parts assembled successively one above another in a deep case or housing.

Japanese Utility Model Laid-open Publication No. 62-7761 exemplifies a geared stepping motor composed of a stepping motor unit and a reduction gear having a train of gears disposed between two opposed support plates. The stepping motor unit and the reduction gear are assembled as separate units and subsequently they are assembled together.

The gearmotor disclosed in Japanese Utility Model Publication No. 63-5419 includes a rotor shaft formed integrally with the deep housing and disposed co-axially in the housing. A stator bobbin having stator windings, a rotor with a pinion, and a reduction gear are stacked in succession about the rotor shaft. Since all the component parts are disposed in the deep housing from the above, manipulation of these component parts involves various limitations which will make it difficult to automate the assembling operation. Furthermore, the integral formation of the rotor shaft and the housing requires a precision working which per se involves various difficulties. With this integral rotor shaft, an error-free mass production of the geared stepping motor is practically impossible. Additionally, the rotor journaled on the rotor shaft must be hollow in shape and fitted accurately with the rotor shaft. This arrangement needs an increased number of manufacturing processes.

The geared stepping motor disclosed in the Japanese Utility Model Laid-open Publication No. 62-7761 has a construction other than the built-up construction and hence is not suited for automated assembling on a transfer machine. Since the geared stepping motor has a relatively large number of component parts and needs a deep housing, building up of the component parts in a stacked condition is difficult to achieve.

The conventional stepping motors include a stator and a rotor assembled in a housing, with the rotor supported by bearings mounted on the housing. As disclosed in Japanese Utility Model Laid-open Publication No. 62-14950, the bearings may comprise oil-impregnated bearings, oilless bearings, oilless metals, ball bearings, etc.

Partly because the bearings are provided on the stepping motor unit, and partly because the stepping motor unit and the reduction gear are formed as separate units before they are assembled together, the overall size of the assembled geared stepping motor is considerably large, accordingly.

In the conventional stepping motors, a stator and a rotor disposed in a housing are assembled in the built-up construction by means of screw fasteners. With this screwed assembly, the stator cores are prevented from interfering with each other. To achieve an automated assembling, stator cores having the so-called "claw-pole" construction are assembled layerwise without using screw fasteners. Upon energization of a stator coil, the assembled stator cores tend to oscillate in resonance with the excited stator coil, thereby generating unpleasant noises.

Furthermore, the conventional stepping motors have terminals provided on ends of a stator coil wound on and around a coil bobbin. After winding, the stator coil is bound with a bind tape or a synthetic resin against loosening and subsequently is connected with terminals for connection with an external connector. The terminals are pulled to the outside of the motor. The foregoing construction has a drawback that the stator coil is likely to be damaged or broken when it is pulled to connect the terminals to the external connector. The terminals may be integrally molded with the bobbin. In this instance however, the stator coil is still subjected to pulling forces when the terminals are connected with or released from the external connector. Furthermore, the integral formation of the terminals and the bobbin lowers the mechanical strength of the bobbin and makes it difficult to assemble the built-up stepping motor.

SUMMARY OF THE INVENTION

The invention has for its object to provide a stepping motor having a reduction gear which is suited for an automated assembling of the stepping motor and is contributable to the reduction of the overall motor size.

Another object of the invention is to provide a stepping motor having a reduction gear which is small in size and disposed in one housing of the stepping motor for facilitating building up of the stepping motor.

A further object of the invention is to provide a geared stepping motor including a rotor composed of a rotor body and a rotor shaft which are united in an integral formation for facilitating assembling of the stepping motor.

Another object of the invention is to provide a stepping motor with a reduction gear, which is capable of forming a single unit when it is assembled with various apparatus having a mechanism to be driven by the stepping motor.

A further object of the present invention is to provide a stepping motor with a reduction gear, which has a relatively small number of component parts and hence can be assembled with utmost ease.

Another object of the present invention is to provide a built-up stepping motor having structural features which are suited for automated assembling and capable of preventing stacked upper and lower stator cores from chattering.

A further object of the present invention is to provide a built-up stepping motor having an improved mount for terminals which protects a coil from damaging or breaking down even when the coil is subjected to pulling forces during attachment and detachment of the terminals relative to external connectors.

A further object of the present invention is to provide a built-up stepping motor having a terminal mounting structure suited for automated assembling of the stepping motor.

More specifically, a first aspect of the invention provides a built-up geared stepping motor, comprising: an upper housing having a first internal space; a lower housing having a second internal space; a support plate disposed between the upper and lower housings; an annular stator disposed in the second internal space and held between the lower housing and the support plate; a rotor received in the annular stator and rotatably supported by the lower housing and the support plate, the rotor including a rotor shaft and a rotor body integral with the rotor shaft: a reduction gear disposed in the first internal space and held between the support plate and the upper housing, the reduction gear including a train of gears which lowers the output speed of the rotor shaft; the lower housing having on its bottom a first bearing rotatably supporting an end of the rotor shaft; and the support plate having a plurality of support shafts rotatably supporting thereon the respective gears of the reduction gear, and a second bearing hole rotatably supporting an output end of the rotor shaft.

Since a casing of the stepping motor is composed of two housings separated by the support plate, the respective housings have a relatively small depth. The use of such shallow housings, the component parts can be placed vertically and laterally into the shallow housings. This makes it possible to automate assembling of the stepping motor. The shape and configuration of the housings can be changed in view of the shape and arrangement of the component parts to be received in the housings, as well as the shape and arrangement of a device to which the stepping motor is assembled. Since the rotor shaft and the rotor body are integral, the rotor is replaceable with a rotor of the conventional stepping motor.

The rotor is supported by a first bearing formed in the lower housing and a second bearing formed in the support plate. It is therefore no longer necessary to provide separate bearings as in the conventional stepping motors. The bearing of the rotor and the support shafts of the gears of the reduction gear are integrally formed so that the number of component parts and the overall size of the stepping motor are considerably reduced. The support plate disposed between the reduction gear and the motor unit is contributable to the reduction of operation noise. Due to the provision of the upstanding support shafts on the support plate, the reduction gear can be assembled with utmost ease. Since the pinion is formed integrally with the output end of the rotor shaft, the overall size of the geared stepping motor is relatively small.

A second aspect of the invention provides a built-up geared stepping motor, comprising: a lower housing formed of a synthetic resin and having an internal space, the lower housing further including a plurality of first locking projections disposed in the internal space, and a plurality of second locking projections disposed outside the internal space; an upper housing having a plurality of mounting holes fitted with the second locking projections, the second locking projections being thermally fused to join the upper and lower housings; a support plate disposed between the upper and lower housings and having a plurality of first guide holes fitted with the second locking projections; an annular stator received in the internal space and held between the lower housing and the support plate, the stator being composed of a plurality of stator cores disposed one above another and each including a pair of stator core members and a coil disposed between the stator core members, each the stator core members having a plurality of second guide holes fitted with the first locking projections of the lower housing and a plurality of third guide holes, the coil having on its opposite surfaces a plurality of third locking projections fitted with the third guide holes of the stator core members; a rotor rotatably received in the annular stator; a reduction gear disposed between the upper housing and the support plate and including a first gear and a second gear held in meshing with the first gear; and one of the pair of stator core members, the coil and the other of the pair of stator core member being stacked in the lower housing in the order named to form one of the plural stator cores of the stator, each the stator cores, the rotor, the support plate and the upper housing being assembled in a stacked condition in the order named.

With this construction, the stator core members and the coil can be assembled easily and accurately because both stator core members are positioned relative to the coil and not relative to each other. Since the locking projections on the lower housing are fitted with guide holes in the support plate and mounting holes in the upper housing, the upper and lower housings and the support plate can be assembled simultaneously by a single operation. In this instance, fastening between the respective component parts retained between the upper and lower housings is no longer necessary because they are retained in a stacked condition by engagement of the locking projections and the guide holes. The upper and lower housings are united together by thermal welding or fusing without using screw fastener. Such mode of bonding is well suited for an automated assembling.

A third aspect of the invention provides a built-up stepping motor, comprising: an upper housing; a lower housing constituting a casing jointly with the upper housing; a support plate held between the upper and lower housings; an upper stator core disposed between the support plate and the lower housing; a lower stator core disposed between the support plate and the lower housing and laminated with the upper stator core, the lower stator core and the upper stator core being out of phase by a predetermined angle; each of the upper and lower stator core including a socket-like female stator core member having a plurality of first guide holes and a plurality of first claw-like poles; a plug-like male stator core member having a plurality of second guide holes and a plurality of second claw-like poles; and a coil having a bobbin, the bobbin having a plurality of first locking projections disposed on one of its opposite ends of the bobbin and fitted with the first guide holes in the female stator core member, and a second locking projection disposed on the opposite end and fitted with one of the second guide holes of the male stator core member, second locking projection having a height larger than the thickness of the material of the male stator core member, the first claw-like poles and the second claw-like poles being out of phase by a predetermined angle; a damper disposed between the upper and lower stator cores; and the upper and lower stator cores being assembled back-to-back, with their respective male stator core members held in confrontation to one another.

The damper disposed between two stator cores prevents the stator cores from chattering which would otherwise be caused by resonance oscillation between the cores and the excited coil. The corrugated damper provides enhanced shock-absorbing property which leads to a further reduction of noise level. Owing to interlocking engagement of the guide holes of the damper and the locking projections on the stator core, the damper can be assembled with accuracy.

A fourth aspect of the invention provides a built-up stepping motor, comprising: an upper housing; a lower housing; a stator disposed between the upper and lower housings and having a plurality of terminals, each the terminals including an inner portion disposed inside the lower housing, an outer portion projecting from the lower housing and an intermediate portion joining the inner and outer portions, the inner portion having a width larger than that of the outer portion; a rotor disposed between the upper and lower housings; and the lower housing having a plurality of grooves receiving therein the intermediate portions, the grooves having a shape complementary in contour to the shape of the intermediate portion.

Partly because the inner portion of the terminal which is wider than the outer portion, and partly because the shape of the intermediate portion which is complementary in contour to the shape of the groove, the terminal is locked in position against displacement even when it is pulled outwardly. The interlocking engagement between the groove and the intermediate portion provides a positive guide when the stator with terminals mounted thereon is assembled. Since the height of the locking projection engageable with the cutout recess is at least twice as large as the thickness of the material of the stator core, the core can be held in an accurate position relative to the bobbin.

A fifth aspect of the invention provides a built-up stepping motor, comprising: an upper housing; a lower housing; a stator disposed between the upper and lower housings; a rotor disposed between the upper and lower housings; the stator being composed of a pair of superposed stator cores each including a plug-like male stator core member having a plurality of first guide holes, a socket-like female stator core member and having a plurality of second guide holes, and a coil disposed between the male and female stator core members, the male stator core member of one of the pair of stator cores and the male stator core member of the other of the pair of stator cores being disposed in back-to-back confrontation; and the coil including a bobbin, windings wound around the bobbin and a plurality of terminals electrically connected with the windings, the bobbin having opposite end flanges between which the windings are disposed, one of the end flanges having a mounting portion carrying thereon the terminals and a first locking projection fitted with one of the first guide holes in the male stator core member, the first locking projection having a height at least twice as large as the thickness of the material of the male stator core member, the opposite end flange having at least two second locking projections fitted with two of the plural second guide holes, the second locking projections having a height smaller than the thickness of the material of the female stator core member.

Since the height of the first locking projection is at least twice as large as the thickness of the material of the male stator core member, two such male stator core members are matched correctly. The height of the second locking projections are smaller than the thickness of the material of the female stator core member so that the second locking projections ar completely received in the guide holes in the female stator core member without interference with related part. Since the height of the locking projection which is engageable with the cutout recess of the male stator core member is at least twice as large as the thickness of the material of the stator core, the core member can be held in an accurate position relative to the bobbin.

A sixth aspect of the invention provides built-up geared stepping motor, comprising: an upper housing; a lower housing; a support plate held between the upper and lower housing; a stator disposed between the lower housing and the support plate; a rotor disposed between the lower housing and the support plate and including a rotor shaft and a rotor body integral with the rotor shaft; a reduction gear disposed between the upper housing and the support plate and including a first gear and a second gear held in mesh with the first gear; and the upper housing having a pair of lateral locking projections disposed on opposite outer surfaces of the upper housing for interlocking engagement with guide holes in an apparatus to which the stepping motor is to be assembled.

With the lateral locking projections on the upper housing, the stepping motor can be mounted on an apparatus with utmost ease. The gear while being driven by the pinion on the rotor is stabilized by the rib. The rib may be rounded in which instance the contact area and hence friction resistance between the rib and the gear and hence a friction is considerably reduced with the result that the stepping motor is able to operate with minimum power loss. Since the bearing of the first gear is provided on the upper housing, a conventional support plate is no longer necessary and hence the axial height of the reduction gear is substantially reduced. The stepping motor having such reduction gear is small in size and light in weight.

The above and other objects, features and advantages of the present invention will become more apparent from the following description when making reference to the detailed description and the accompanying sheets of drawings in which a preferred structural embodiment incorporating the principles of the present invention is shown by way of illustrative example.

DETAILED DESCRIPTION OF THE INVENTION

Figure 1:
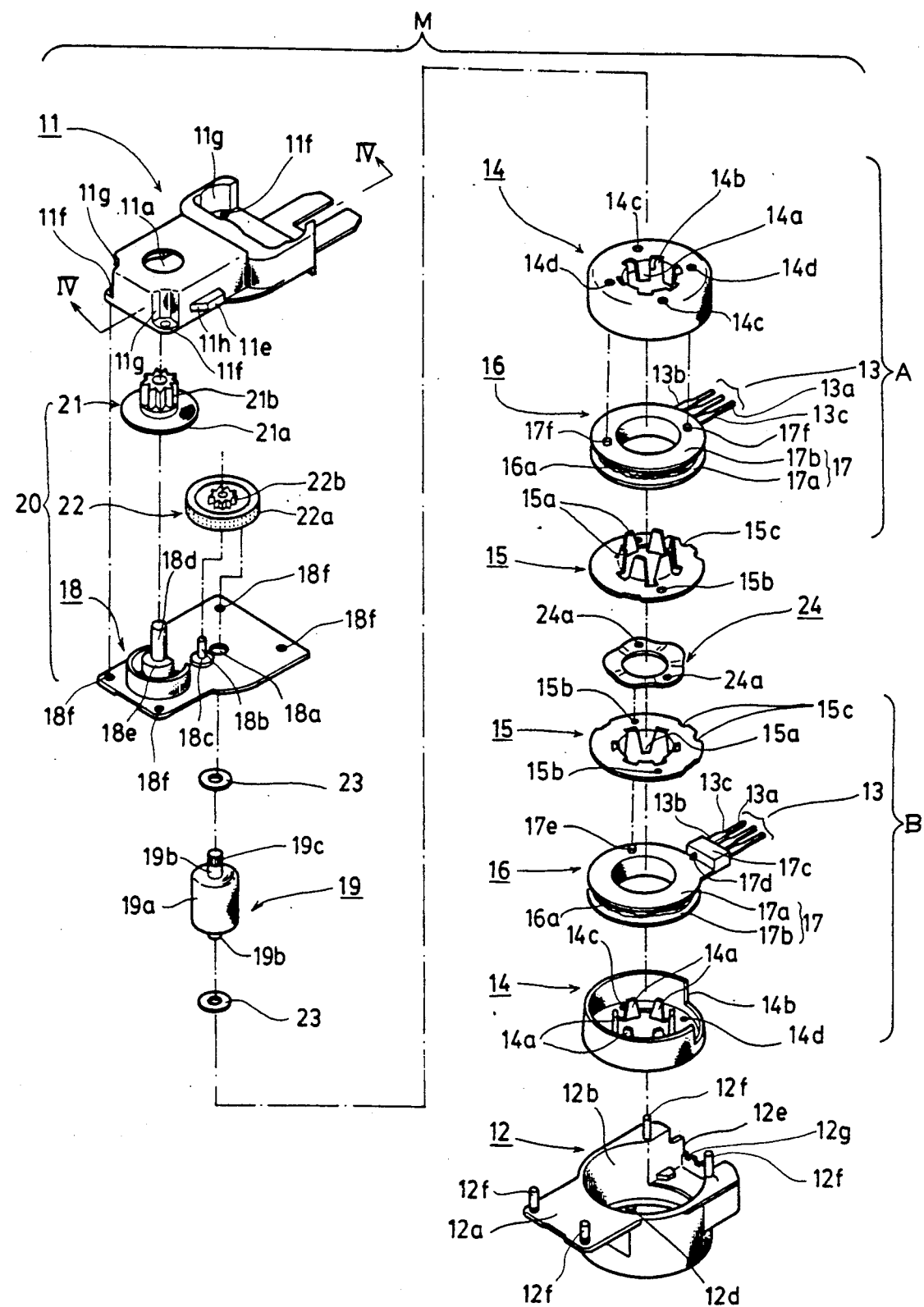
FIG. 1 is an exploded perspective view of a built-up geared stepping motor according to the present invention.
Figure 2:
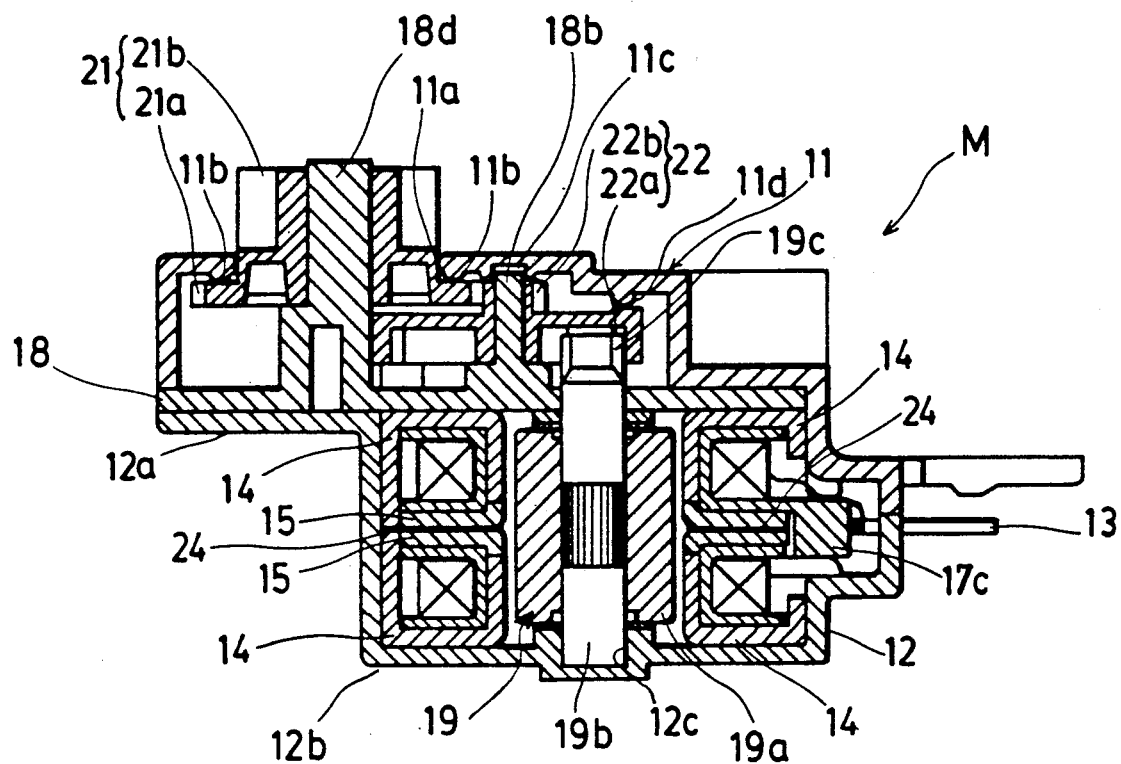
FIG. 2 is a vertical cross-sectional view of the stepping motor.

As shown in FIG. 1 and 2, a stepping motor M embodying the present invention generally comprises two housings 11, 12, an annular stator composed of two stator cores A, B each comprising a pair of stator core members 14, 15, a support plate 18, a rotor 19 composed of a rotor shaft and a rotor body integral with the rotor shaft, and a reduction gear 20 including a first gear 22 and a second gear 21, all the component parts 14–22 being assembled with each other within an internal space defined jointly by and between the housings 11, 12.

Figure 3:
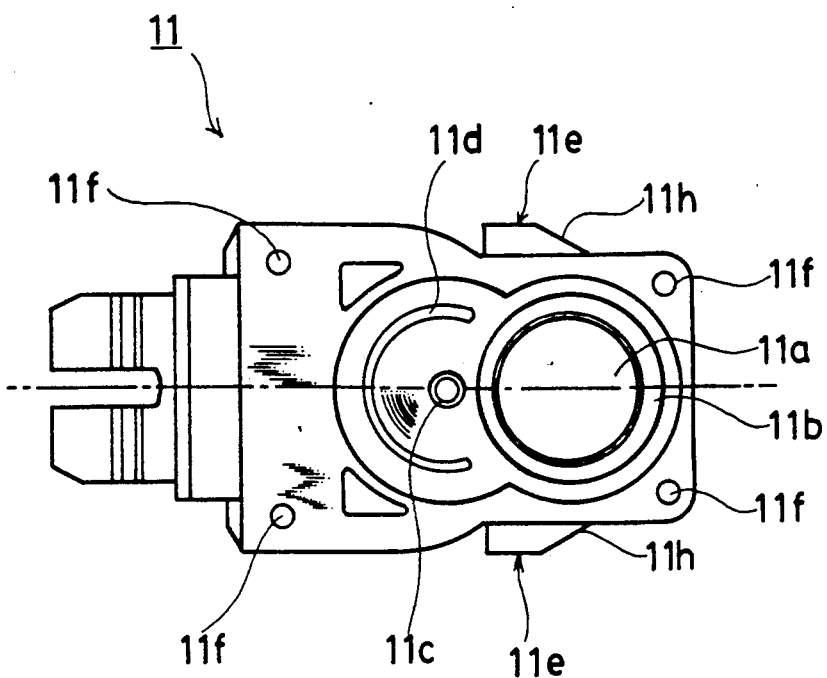
FIG. 3 is a bottom view of an upper housing of the stepping motor, showing the interior side of the upper housing.
Figure 4:
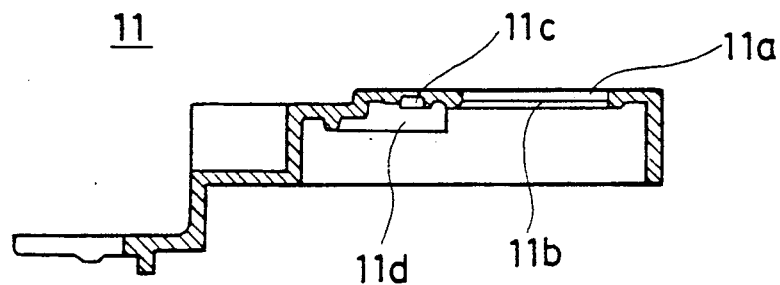
FIG. 4 is a cross-sectional view taken along line IV—IV of FIG. 1.
Figure 5:
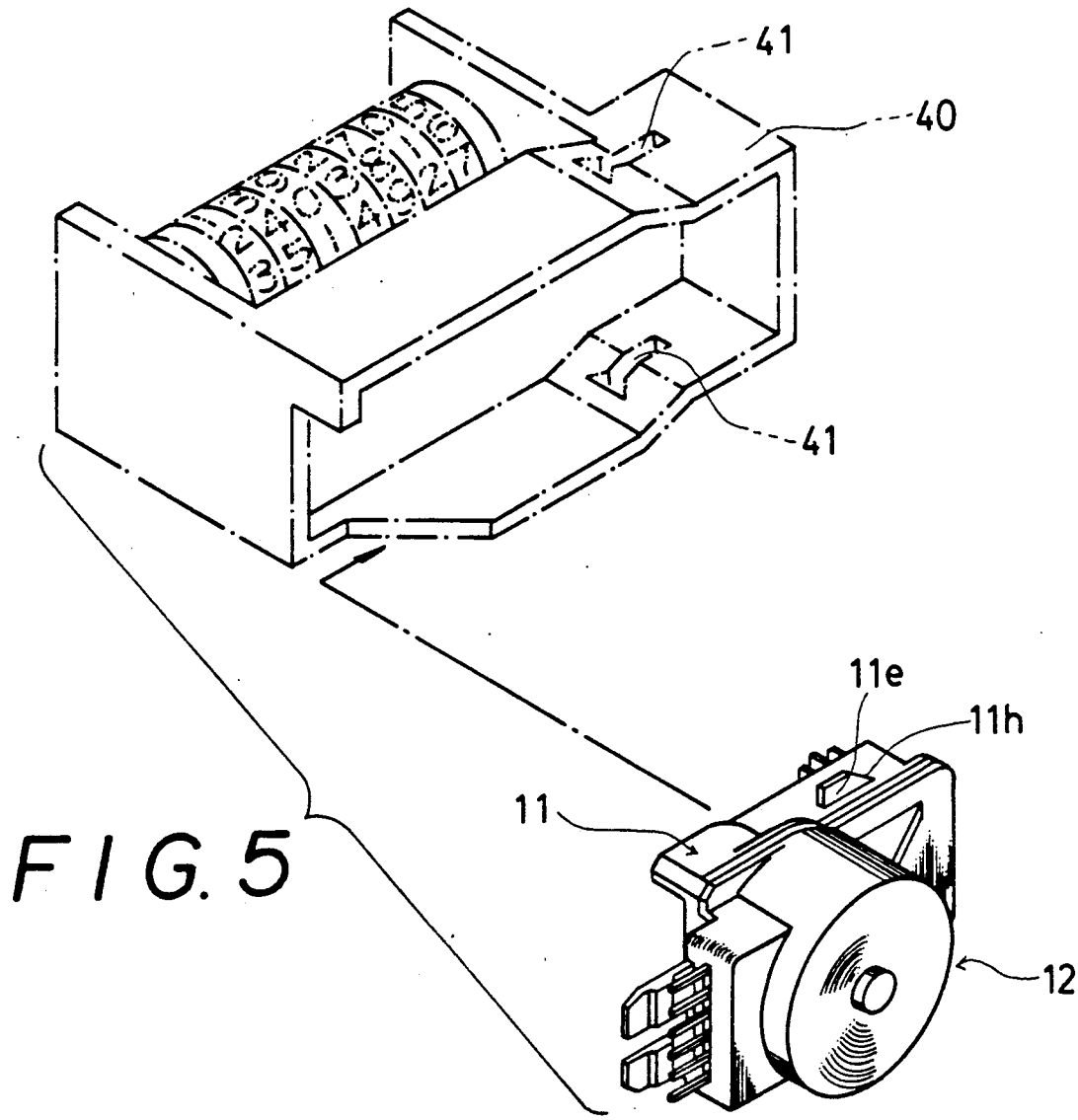
FIG. 5 is a perspective view of the stepping motor as it is assembled with an odometer.

The housing 11 which is disposed on the output side of the stepping motor and hereinafter referred to as "upper housing" has a circular hole 11a through which the second gear 21 of the reduction gear 20 is partly exposed. As shown in FIGS. 3 and 4, the upper housing 11 has on its under surface an annular projection or rib 11b extending around the full circumference of the hole 11a for guided engagement with a lower gear 21a of the second gear 21. A circular bearing recess 11c is formed in the under surface of the upper housing 11 adjacent to the hole 11a for receiving therein 18b on which the first gear 22 is journaled. Also formed on the under surface of the upper housing 11 is a semicircular rib 11d extending concentrically around the bearing recess 11c for guided engagement with the first gear 22. The ribs 11b, 11d are rounded as shown in FIG. 2 and hence provide a low friction resistance while the gears 21, 22 are rotating. The upper housing 11 further has a pair of locking projections or wings 11e, 11e (FIGS. 1, 3 and 5) projecting laterally outwardly from opposite sidewalls for facilitating installation of the stepper motor relative to an apparatus, as shown in FIG. 5. The locking wings 11e, 11e have sloped guide edges 11h tapering toward one side of the upper housing 11. The sloped guide edges 11h facilitates smooth engagement of the locking wings 11e, 11e and corresponding retaining holes 41, 41 formed in a frame 40 of the apparatus (odometer in the illustrated embodiment) when they are snapped. The upper housing 11 further has four mounting holes 11f at predetermined positions adjacent to four corners thereof for attachment with the lower housing 12 described later. The upper housing 11 is recessed as at 11g in the vicinity of each mounting holes 11f so as to permit an electrode of a thermal welding machine to access the mounting hole 11f when the upper and lower housings 11, 12 are joined by thermal welding.

Figure 6:
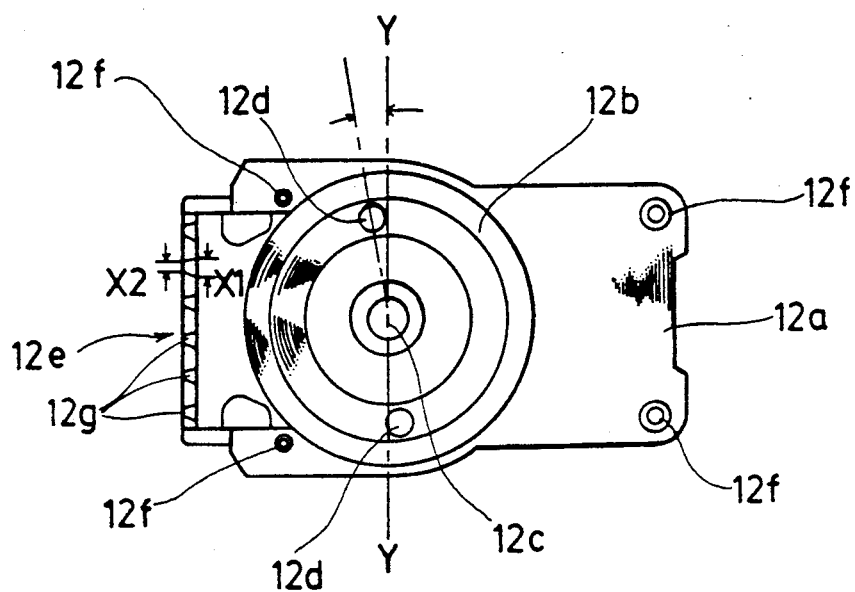
FIG. 6 is a plan view of a lower housing of the stepping motor, showing the interior side of the lower housing.

The housing 12 which is disposed on the side opposite to the output side of the stepping motor and hereinafter referred to as "lower housing" includes a substantially cup-shaped body 12b for receiving therein a stator, and a rectangular flange 12a extending perpendicularly from an open end of the cup-shaped body 12b. The body 12b has in its under surface a central circular bearing recess 12c formed for receiving therein one end of a rotor shaft, and a pair of guide projections 12d, 12d for positioning a stator core, the guide projections 12d being located closer to the side wall of the cup-shaped body 12b than to the central circular recess 12c as shown in FIG. 6. The guide projections 12d are angularly displaced at an angle of 7.5 degrees from a plane Y—Y extending parallel to the axis of the cup-shaped body 12b. The housing body 12b has a recessed portion 12e located diametrically opposite to the flange 12a for receiving therein a terminal assembly.

The recessed portion 12e has a plurality of laterally spaced grooves 12g for receiving therein respective terminals 13 of the terminal assembly. As shown in FIG. 6, the grooves 12g have respective inner ends whose width X1 is larger than the width X2 of the outside ends of the grooves 12g for a purpose described later. The lower housing 12 further has four locking projections 12f on an upper surface thereof at positions corresponding to the positions of the respective mounting holes 11f of the upper housing 11. The locking projections 12f are received in the corresponding ones of the mounting holes 11f and thermally welded to the material defining the mounting holes 11f, as described below.

Figure 7:
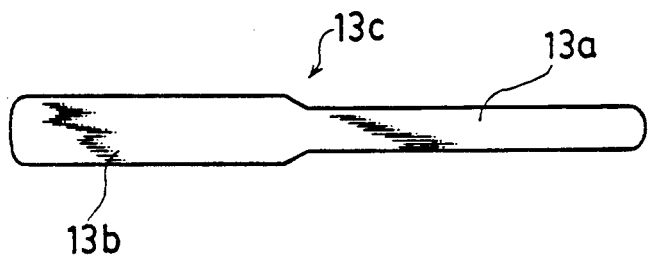
FIG. 7 is an enlarged plan view of a terminal.

As shown in FIG. 7, each of the terminals 13 has an elongated rectangular shape and is composed of a narrow outer portion 13a adapted to be withdrawn from the stepper motor, and a wide inner portion 13b disposed inside the stepping motor. The outer and inner portions 13a, 13b of the terminal 13 are joined together by an intermediate portion 13c which has a configuration complementary in shape to the shape of the grooves 12g.

The stator is composed of upper and outer stator cores A, B stacked together. The stator cores A, B have the so-called "claw-pole" construction and each comprise a socket-like female stator core member 14 and a plug-like male stator core member 15 which are assembled together with a stator coil 16 disposed therebetween. The socket-like female stator core member 14 is press-formed from a sheet metal and has a plurality (six in the illustrated embodiment) of upstanding claw-like poles 14a (hereinafter referred to as "claw-pole") projecting from the bottom wall thereof and circumferentially spaced at equal angular intervals (at an angle of 60 degrees in the illustrated embodiment). The plug-like male stator core member 15 is also pressed-formed from a sheet metal and has on its bottom wall a plurality of upstanding claw poles 15a corresponding in number to the number of the claw poles 14a of the female stator core member 14, the claw poles 15a being circumferentially spaced at equal angular intervals (at an angle of 60 degrees in the illustrated embodiment). For assembling, the female stator core member 14 is disposed on the outer side while the male stator core member 15 is disposed on the inner side.

The female stator core member 14 further has a recess 14b formed in the side wall thereof for positioning the terminals 13. A pair of diametrically opposite first guide holes 14c and a pair of diametrically opposite second guide holes 14d are formed in the bottom wall of the female stator core member 14. Each of the first guide holes 14c and one of the second guide holes 14d is circumferentially spaced apart at an angle of 82.5 degrees, while the other second guide hole 14d is circumferentially spaced from this first guide hole 14c at an angle of 97.5 degrees. The first and second guide holes 14c, 14d have different diameters and in the illustrated embodiment, the first guide holes 14c are larger in diameter than the second guide holes 14d. The first guide holes 14c are in radial alignment with two diametrically opposed claw poles 14c and fitted over the guide projections 12d of the under housing 12. The second guide holes 14d are fitted over two locking projections provided on a bobbin, described later, of each stator coil 16.

The plug-like male stator core member 15 has a pair of diametrically opposite guide holes 15b each disposed between two adjacent ones of the upstanding claw poles 15a but angularly displaced toward one of the two adjacent claw poles at an angle of 7.5 degrees. The male stator core member 15 further has two circumferentially spaced cutout recesses 15c along an outer peripheral edge thereof. Each of the cutout recesses 15c is spaced at an angle of 82.5 degrees from an adjacent one of the guide holes 15b. The cutout recesses 15c are corresponding in position to the position of the recessed portion 12e of the lower housing 12. The guide holes 15b are engageable with a locking projection on the coil bobbin, described later. The cutout recesses 15c are engageable with a locking projection on a mounting portion, described later, for the terminals 13. The claw poles 14a of the female stator core member 14 and the claw poles 15a of the male stator core member 15 are 30 degrees out-of-phase.

Figure 8:
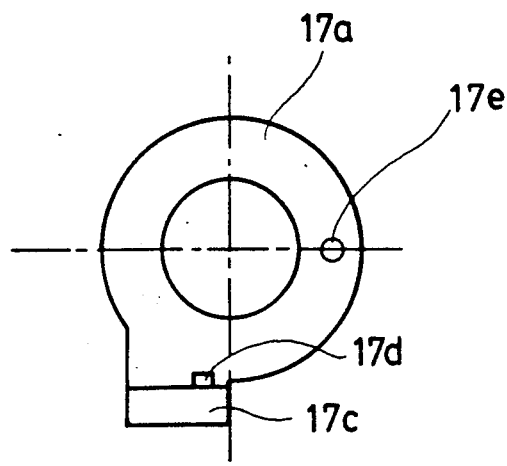
FIG. 8 is a plan view illustrative of one side of a bobbin on terminals are supported.
Figure 9:
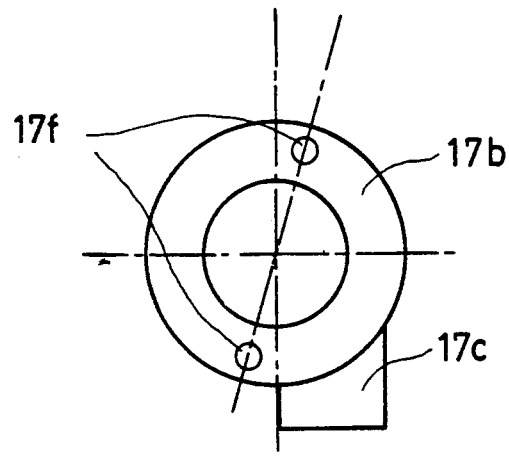
FIG. 9 is a plan view illustrative of the opposite side of the bobbin free of terminals.

The stator coil 16 is composed of a bobbin 17, conductors 16a and the terminals 13. The bobbin 17 has opposite end flanges 17a, 17b between which conductors 16a are wound. The end flange 17a is provided with the terminals 13 while the opposite end flange 17b is free of the terminals 13. Ends of the conductors are electrically connected with the terminals 13. The end flange 17a includes a substantially rectangular mounting portion 17c extending tangentially and outwardly for supporting thereon the terminals 13. As shown in FIG. 8, the end flange 17a has a first locking projection 17d adjacent to an inner side wall of the mounting portion 17c and lockingly engageable with one of the cutout recesses 15c of the male stator core member 15. The locking projection 17d has a height at least twice as large as the thickness of the material of the male stator core member 15. The end flange 17a further has a second locking projection 17e (FIGS. 1 and 8) extending parallel to the axis of the bobbin 17 and lockingly engageable with one of the guide holes 15b of the male stator core member 15. The locking projection 17e has a height at least twice as large as the thickness of the material of the male stator core member 15. In the illustrated embodiment, the locking projection 17e is disposed in alignment with the plane Y—Y (FIG. 6) and is situated on one side of the end flange 17a which corresponds in position to the position the upper half of the lower housing 12 as viewed in FIG. 6.

The end flange 17b has a pair of diametrically opposite locking projections 17f lockingly engageable with the guide holes 14d, respectively, of the female stator core member 14. The locking projections 17f are displaced at an angle of 15 degrees relative to a longitudinal axis of the terminals 13. The height of the locking projections 17f is smaller than the thickness of the material of the female stator core member 14.

The stator coil 16 thus constructed is held by and between the female and male stator core members 14, 15 to jointly constitute one of the upper and lower stator cores A, B.

According to the illustrated embodiment, the upper and lower stator cores A, B are assembled layerwise with the respective male stator core members 15, 15 disposed in face-to-face confrontation. In this instance, a damper 24 of a shock-absorbing material is disposed between these male stator core members 15, 15. The damper 24 comprises a corrugated damper and has a pair of diametrically opposite guide holes 24a formed in alignment with the guide holes 15b of the male stator core members 15 and engageable with the locking projections 17e on the respective end flanges 17a of the bobbins 17 to hold the upper and lower stator cores A, B in position against displacement. The shock-absorbing damper 24 disposed between the male stator core members 15 prevents the male stator core members 15 from chattering which would otherwise be caused by resonant oscillation of the male stator core members 15 in response to the vibration of the excited stator coils when the stators core members 14, 15 and the coils 16 are assembled in stacked condition without using permanent fastening means such as molding or welding, in order to enable an automated assembling with a rotor comprised of a shaft and a body integrally formed with each other as in the case of the present invention.

The support plate 18 is disposed between the upper housing 11 and the lower housing 12. The support plate 16 is so contoured as to have the same configuration as the lower housing 12 and is formed from synthetic resin containing carbon. In the illustrated embodiment, the support plate 18 is made of a plastic material comprising 70% of polyphenylene sulfate and 30% of carbon. The support plate 18 serves both as a bearing for the rotor 19 and as a support for gears of the reduction gear 20. As shown in FIG. 1, the support plate 18 has a circular bearing hole 18a for receiving therein the opposite end of the rotor shaft, a first upstanding support shaft 18b disposed adjacent to the bearing hole 18a for rotatably supporting thereon the first gear 22 of the reduction gear 20, and a circular boss 18c at the base of the first support shaft 18b for retaining thereon the first gear 22. A second support shaft 18d for rotatably supporting thereon the second gear 21 is disposed on the support plate 18 adjacent to the first support shaft 18b. The second support shaft 18d includes a circular boss 18e at the base thereof for retaining thereon the second gear 21. The support plate 18 further has four guide holes 18f adjacent to its four corners. The guide holes 18f are formed in alignment with corresponding ones of the mounting holes 11f in the upper housing 11 and also with corresponding ones of the locking projections 12f on the lower housing 12.

The rotor 19 includes a rotor body 19a formed of a plastic permanent magnet and a rotor shaft 19b formed integrally with the rotor body 19a. The rotor shaft 19b has an output end on which is formed a drive gear composed of a pinion 19c as shown in FIGS. 1 and 2. The pinion 19c is placed in driving mesh with the first gear 22 of the reduction gear 20.

As described above, the reduction gear 20 is composed of the first gear 22 and the second gear 21. Each of the gears 22, 21 is a composite gear having an upper gear and a lower gear united together in co-axial arrangement. The first gear 22 is journaled on the first support shaft 18b of the support plate 18, with a lower gear 22a rotatably supported on the boss 18c of the first support shaft 18b. The lower gear 22a is an internal gear having on its inside peripheral edge a plurality of gear teeth. The number of teeth of the internal gear 22a is larger than the number of teeth of the pinion 19c of the rotor 19. The lower internal gear 22a is held in driven mesh with the pinion 19c. The upper gear 22b is an external gear having teeth smaller in number than the number of teeth of the lower internal gear 22a (in the illustrated embodiment, the upper external gear 22b has a same number of teeth as the pinion 19c). The upper external gear 22b is held in driving mesh with a lower gear 21a of the second gear 21 which is journaled on the second support shaft 18d on the support plate 18 with the lower gear 21a rotatably supported on the boss 18e. The lower gear 21a is an external gear and has gear teeth larger in number than the gear teeth on an upper gear 21b of the second gear 21. The lower external gear 21a is disposed in the upper housing 11, while the upper gear 21b projects from the upper housing 11 through the circular hole 11a in the upper housing 11.

The foregoing components parts are assembled together in the manner described below. In brief, structural component parts of the lower stator core B are stacked successively one above another in the lower housing 12 and subsequently structural component parts of the upper stator core A are stacked successively one above another in the lower housing 12. Thereafter, the rotor 19, the support plate 18, the reduction gear 20 and the upper housing 11 are stacked in the order named. A sequence of the assembling operation will be described below in greater detail.

After the lower housing 12 is supported in a horizontal plane with its open end facing upward, the female stator core member 14 of the lower stator core B is placed into the housing 12 with its claw poles 14a directed upward. In this instance, the recess 14b of the female stator core member 14 is aligned with the recessed portion 12e of the lower housing 12 and the first guide holes 14c of the female stator core member 14 are fitted over the locking projections 12d of the lower housing 12. Since the first guide holes 14c have a different diameter to the diameter of the second guide holes 14d, assembling of the female stator core member 14 and the lower housing 12 can be achieved smoothly and accurately without mismatching.

Then, the coil 16 of the lower stator core B is placed on the female stator core member 14. In this instance, the respective terminals 13 are snugly received in the corresponding grooves 12g of the lower housing 12 whereupon the locking projections 17f on the bobbin 17 are brought into fitting engagement with the second guide holes 14d of the female stator core member 14.

Subsequently, the male stator core member 15 of the lower stator core B is placed over the coil 16 with its claw poles 15a directed downward until one of the guide holes 15b and one of the cutout recesses 15c are held in locking engagement, respectively, with the locking projection 17e on the end flange 17a and the locking projection 17d on the mounting portion 17c of the bobbin 17. The lower stator core B is thus assembled with the lower housing 12. In this assembled condition, the claw poles 14a of the female stator core member 14 and the claw poles 15a of the male stator core member 15 are circumferentially spaced at equal angular intervals (30 degrees in the illustrated embodiment). The locking projections 17d, 17e project upwardly beyond the thickness of the material of the male stator core member 15.

Thereafter, the upper stator core A is assembled in which instance the corrugated damper 24 is disposed on the male stator core member 15 of the lower stator core B. The male stator core member 15 of the upper stator core A is placed on the corrugated damper 24 with its claw poles 15a directed upward. In this instance, one of the guide holes 15b of the male stator core member 15 is fitted over the locking projection 17e on the bobbin 17 through the corresponding guide hole 24a of the corrugated damper 24, and one of the cutout recesses 15b is fitted over the locking projection 17d of the bobbin 17. The male stator core member 15 of the upper stator core A is thus positioned accurately relative to the male stator core member 15 of the lower stator core B.

Then, with the locking projection 17e facing downward, the coil 16 of the upper stator core A is placed over the male stator core member 15 in the manner same as done with the coil 16 of the lower stator core B except that the locking projection 17e on the end flange 17a is fitted in the other guide hole 15b of the male stator core member 15 which is not engaged with the locking projection 17e of the bobbin 17 of the lower stator core B, and that the locking projection 17d on the mounting portion 17e of the upper coil 16 is fitted in the other cutout recess 15c which is not occupied with the locking projection 17d of the lower coil 16.

Subsequently, the female stator core member 14 of the upper stator core A is placed over the coil 16 with its claw poles 14a directed downward. In this instance, the recess 14b and the guide holes 14d are kept in alignment with the recessed portion 12e of the lower housing 12 and the locking projections 17f of the bobbin 17. The upper stator core A is thus assembled in the same manner as the lower stator core B. In this assembled condition, the claw poles 15a of the male stator core member 15 and the claw poles 14a of the female stator core member 14 of the upper stator core A are circumferentially spaced at equal intervals (30 degrees in the illustrated embodiment). The claw poles 14a, 15a of the four stator core members 14, 15, 15 and 14 are circumferentially spaced from one another at an angle of 15 degrees. In the illustrated embodiment, the female stator core member 14 of the upper stator core A and the female stator core member 14 of the lower stator core B are 45 degrees out-of-phase.

Then, the rotor 19 is inserted into the stator cores A, B with the input end directed forward until the input end is received in the bearing recess 12c of the lower housing 12 with a washer 23 disposed between the rotor body 19a and the lower housing 12. Another washer 23 is fitted over the output end of the rotor shaft 19b.

Subsequently, the support plate 18 is placed over the lower housing 12 while keeping the guide holes 18f in alignment with the locking projections 12f of the lower housing 12. In this instance, the output end of the rotor shaft 19b is rotatably received in the bearing hole 18a in the support plate 18 with the pinion 19c projecting from the support plate 18. After the first gear 22 is fitted over the first support shaft 18b on the support plate 18 to mesh the lower internal gear 22a with the pinion 19c, the second gear 21 is fitted over the second support shaft 18d on the support plate 18 to place the lower gear 21a into meshing engagement with the upper gear 22b of the first gear 22.

Thereafter, the upper housing 11 is placed over the support plate 18 to cover a substantial part of the reduction gear 20. In this instance the mounting holes 11f of the upper housing 11 are fitted over the locking projections 12f on the lower housing 12, and the upper gear 21b of the second gear 21 projects from the upper housing 11 through the circular hole 11a in the upper housing 11. Finally, the locking projections 12f are fused by thermal welding to thereby join the upper and lower housings 11, 12.

As is apparent from the foregoing description, all the components of the geared stepping motor of the invention can be assembled together by merely stacking them in succession until the upper and lower housings are kept in a superposed condition ready for thermal welding in which the locking projections 12f extend successively through the guide holes 18f of the support plate 18 and through the mounting holes 11f of the upper housing 11. Such a stacked or built-up construction obviates the need for fasteners such as screws and hence is suited for a fully automated assembling.

Obviously, various minor changes and modifications of the present invention are possible in the light of the above teaching. It is therefore to be understood that within the scope of the appended claims the invention may be practiced otherwise than as specifically described.

What is claimed is:

1. A built-up geared stepping motor, comprising:
an upper housing having a first internal space;

a lower housing having a second internal space;

a single support plate disposed between said upper and lower housings;

an annular stator disposed in said second internal space and held between said lower housing and said support plate;

a rotor received in said annular stator and rotatably supported by said lower housing and said support plate, said rotor including a rotor shaft and a rotor body integral with said rotor shaft; and a reduction gear disposed in said first internal space and held between said support plate and said upper housing, said reduction gear including a train of gears which lowers output speed of said rotor shaft;

said lower housing having a first bearing rotatably supporting an end of said rotor shaft;

said support plate having a plurality of support shafts rotatably supporting thereon the respective gears of said reduction gear, and a second bearing hole rotatably supporting an output end of said rotor shaft; and said reduction gear including a first gear and a second gear journaled on said support shafts and held in mesh with each other, said output end of said rotor shaft having a pinion held in mesh with said first gear.

2. A built-up geared stepping motor, comprising:

a lower housing formed of a synthetic resin and having an internal space, said lower housing further including a plurality of first locking projections disposed in said internal space, and a plurality of second locking projections disposed outside said internal space;

an upper housing having a plurality of mounting holes fitted with said second locking projections, said second locking projections being thermally fused to join said upper and lower housings, said upper housing further having a pair of lateral locking projections disposed on opposite outer surfaces of said upper housing for interlocking engagement with guide holes in an apparatus to which said stepping motor is to be assembled, said lateral locking projections having sloped guide edges tapering toward one side of said upper housing;

a support plate disposed between said upper and lower housings and having a plurality of first guide holes fitted with said second locking projections;

an annular stator received in said internal space and held between said lower housing and said support plate, said stator comprising a plurality of stator cores disposed one above another and each including a pair of stator core members and a coil disposed between said stator core members, each said stator core member having a plurality of second guide holes fitted with said first locking projections of said lower housing and a plurality of third guide holes, said coil having on its opposite surfaces a plurality of third locking projections fitted with said third guide holes of said stator core members, a part of said third locking projections, which is disposed on one surface of said coil facing toward the coil of an adjacent stator core through one of said stator core member, being higher than the thickness of said stator core member;

a rotor rotatably received in said annular stator; and a reduction gear disposed between said upper housing and said support plate and including a first gear and a second gear held in meshing engagement;

said upper housing having a circular hole extending through a top wall thereof, said second gear projecting from said upper housing through said circular hole, said upper housing further having a bearing portion rotatably supporting thereon said first gear and an annular rib extending circumferentially along said circular hole for stabilizing rotation of said second gear, said rib having a round guide surface held in sliding contact with said first gear; and one of said pair of stator core members, said coil and the other of said pair of stator core member being stacked in said lower housing in the order named to form one of said plural stator cores of said stator, each said stator core, said rotor, said support plate and said upper housing being assembled in a stacked condition in the order named.

3. A build-up stepping motor, comprising:

an upper housing having a pair of lateral locking projections disposed on opposite outer surfaces of said upper housing for interlocking engagement with guide holes in an apparatus to which said stepping motor is to be assembled, said lateral locking projections having sloped guide edges tapering toward one side of said upper housing;

a lower housing constituting a casing jointly with said upper housing;

a support plate held between said upper and lower housings;

an upper stator core disposed between said support plate and said lower housing;

a lower stator core disposed between said support plate and said lower housing and laminated along with said upper stator core, said lower stator core and said upper stator core being out of phase by a predetermined angle;

each of said upper and lower stator core including a socket-like female stator core member having a plurality of first guide holes and a plurality of first claw-like poles;

a plug-like male stator core member having a plurality of second guide holes and a plurality of second claw-like poles; and a coil having a bobbin, said bobbin having a plurality of first locking projections disposed on one end of said bobbin and fitted with said first guide holes in said female stator core member, and a second locking projection disposed on an opposite end of said bobbin and fitted with one of said second guide holes of said male stator core member, second locking projection having a height larger than the thickness of the material of said male stator core member, said first claw-like poles and said second claw-like poles being out of phase by a predetermined angle; and a damper disposed between said upper and lower stator cores, said damper comprising a corrugated damper and having a plurality of guide holes fitted with said second locking projections of said upper and lower stator cores;

said upper and lower stator cores being assembled back-to-back, with their respective male stator core members held in confrontation to one another.

4. A built-up stepping motor, comprising:

an upper housing having a pair of lateral locking projections disposed on opposite outer surfaces of said upper housing for interlocking engagement with guide holes in an apparatus to which said stepping motor is to be assembled, said lateral locking projections having sloped guide edges tapering toward one side of said upper housing;

a lower housing constituting a casing jointly with said upper housing;

a lower housing;

a stator disposed between said upper and lower housing and having a plurality of terminals, each of said terminals including an inner portion disposed inside said lower housing, an outer portion projecting from said lower housing and an intermediate portion joining said inner and outer portions, said inner portion having a width larger than that of said outer portion; and a rotor disposed between said upper and lower housings;

said lower housing having a plurality of grooves receiving therein said intermediate portions, said grooves having a shape complementary in contour to the shape of said intermediate portion.

5. A built-up stepping motor according to claim 4 wherein said stator includes a plug-like stator core member having a plurality of cutout recesses formed in an outer peripheral edge thereof, and a bobbin assembled with said stator core member and having a mounting portion on which said terminals are mounted, said bobbin further having a locking projection adjacent to said mounting portion and engaged with one of said cutout recesses, said locking projection having a height at least twice as large as the thickness of the material of said stator core member.

6. A built-up stepping motor, comprising:

an upper housing having a pair of lateral locking projections disposed on opposite outer surfaces of said upper housing for interlocking engagement with guide holes in an apparatus to which said stepping motor is to be assembled, said lateral locking projections having sloped guide edges tapering toward one side of said upper housing;

a lower housing;

a stator disposed between said upper and lower housings; and a rotor disposed between said upper and lower housings;

said stator comprising a pair of superposed stator cores each including a plug-like male stator core member having a plurality of first guide holes, a socket-like female stator core member having a plurality of second guide holes, and a coil disposed between said male and female stator core members, said male stator core member of one of said pair of stator cores and said male stator core member of the other of said pair of stator cores being disposed in back-to-back confrontation;

said coil including a bobbin, windings wound around said bobbin and a plurality of terminals electrically connected with said windings, said bobbin having opposite end flanges between which said windings are disposed, one of said end flanges having a mounting portion carrying thereon said terminals and a first locking projection fitted with one of said first guide holes in said male stator core member, said first locking projection having a height at least twice as large as the thickness of the material of said male stator core member, the opposite end flange having at least two second locking projections fitted with two of said plural second guide holes, said second locking projections having a height smaller than the thickness of the material of said female stator core member; and said male stator core member having a cutout recess in its outer peripheral edge, said one end flange having a third locking projection disposed adjacent to said mounting portion and fitted with said cutout recess, said third locking projection having a height at least twice as large as the thickness of the material of said male stator core member.

* * * * *